H. D. PALMER.
Grain Drill.
No. 95,375. Patented Sept. 28, 1869.
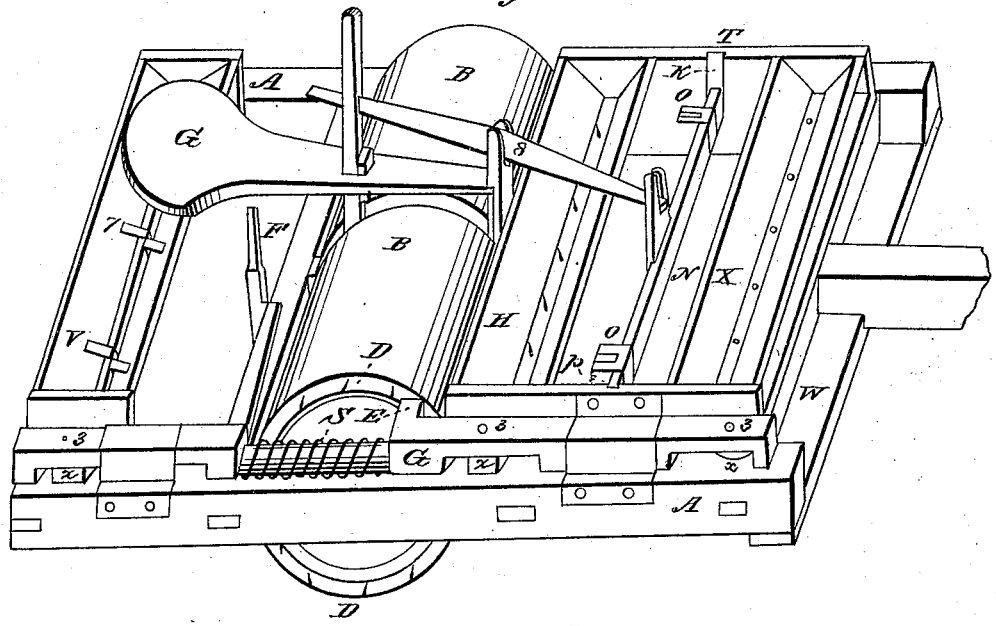
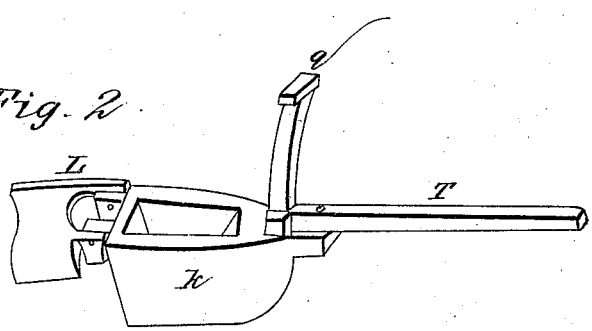
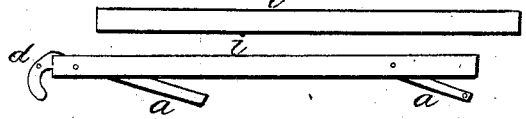
Witnesses:
S. H. Wheeler
R. B. Wheeler
Inventor:
Henry D. Palmer

United States Patent Office.

HENRY D. PALMER, OF VOLENA TOWNSHIP, MICHIGAN.

Letters Patent No. 95,375, dated September 28, 1869; antedated September 22, 1869.

IMPROVEMENT IN COMBINED GRAIN-DRILL AND LAND-ROLLER.

The Schedule referred to in these Letters Patent and making part of the same.

*To all whom it may concern:*

Be it known that I, HENRY D. PALMER, of Volena township, in the county of Cass, and State of Michigan, have invented a new and improved Machine for Rolling Land, Sowing Grain in Drills, Grass-Seed, and Plaster; and I do hereby declare that the following is a clear and exact description thereof, reference being had to the annexed drawings, making a part of this specification, in which—

Figure 1 is a perspective view, and

Figure 2 is a detached section, showing the draught-bar and shoe.

Figure 3 shows the arrangement of the device for governing the quantity of seed sown.

The object sought in my invention is to arrange a more simple, cheaper, and more durable combined land-roller, grain-drill, seed and plaster-sower.

To enable others skilled in the arts to make and use my invention, I will proceed to describe its use and construction.

A A is the main frame.

B B are the rollers.

C is a reciprocating bar, moved forward by means of pins D, projecting from the outer end of the right-hand roller, as they impinge on the shoulder E of bar C, and is thrown back by the spring S.

The bar C has pins 3, 3, 3, projecting from the under side, and working in diagonal grooves in the feed-bars $x$ $x$ $x$, causing a reciprocating motion of said bars.

V is a hopper, for sowing plaster, provided with forked projections 7, on the bar $x$, to prevent the plaster from sticking or lodging on the bottom of the hopper.

H is a grain-hopper, the bottom of which consists of two parallel bars of iron, $i$ $i$, pivoted, at each end, to oblique cross-arms $a$ $a$, one of which forms the handle $d$, by means of which one of the bars $i$ $i$ can be moved, the other being made stationary.

Any movement of the handle $d$ causes a longitudinal and lateral motion of one of the bars $i$ $i$, maintaining a parallel position of said bars, and regulating the amount of grain discharged.

$x$ is a hopper, for sowing grass-seed, constructed in the usual way.

$k$ is an iron or steel shoe, for forming the drills; and any number may be used that will accommodate the width of the machine, placing the shoes about six inches apart, side by side.

L are coverers, pivoted to the shoes $k$.

The draught-bar T is bolted to the shoe $k$, one end of which is bent, and stands in a vertical position, working up and down in the slotted brackets $o$ $o$, thus preventing the shoes $k$ from crowding sideways, the upper end of which has a broad head, 9, to prevent it from drawing down through the brackets $o$ $o$.

The bar N, to which brackets $o$ $o$ are attached, works up and down in the grooves $r$ $r$, and is actuated by the lever 8, for the purpose of raising the shoes $k$, when desired.

The bar W, to which the draught-bars T are hinged, may be removed when it is desirable to use the machine only as a land-roller.

It will be seen that the drawings do not show the whole number of like parts, but all of the different parts are shown excepting the conductors for conveying the grain into the drills, for which I design using flexible pipes, of the ordinary construction.

The reciprocating bar C may be made of wood or iron, but, when made of wood, should be lined with iron in places exposed to wear.

The grooves in feed-bars $x$ $x$ $x$ should be lined with iron, to prevent wear and friction as much as possible.

G is the driver's seat, and

F is a lever, pivoted to the slide 5, by which the reciprocating bar C may be moved forward, and held in a position to let the pins D pass clear of the shoulder E, thus stopping the motion of the feed-works when desired.

The handle $d$ is provided with a pin, or its equivalent, for the purpose of fastening it in the proper position for the discharge of the quantity of grain required.

Having thus described my invention,

What I claim as new, and desire to secure by Letters Patent, is—

In a combined land-roller, grain-drill, seed and plaster-sower, the construction and arrangement of the reciprocating bar C, in combination with the spring S, pins 3, 3, 3, and grooved feed-bars $x$ $x$ $x$, as specified.

In testimony that I claim the foregoing, I have hereunto set my hand, this 25th day of September, 1868.

HENRY D. PALMER.

Witnesses:
HENRY MICHAEL,
S. H. WHEELER.